United States Patent [19]
Urleb et al.

[11] Patent Number: 5,170,827
[45] Date of Patent: Dec. 15, 1992

[54] DETACHABLE ANTI-SKID CHAIN FOR A VEHICLE WHEEL

[76] Inventors: Alfred Urleb, Steyergasse 74, A-8010 Graz; Willibald Gangl, Beletweg 1, A-8042 Raaba, both of Austria

[21] Appl. No.: 449,888

[22] PCT Filed: Jun. 8, 1988

[86] PCT No.: PCT/EP88/00506
§ 371 Date: Dec. 7, 1989
§ 102(e) Date: Dec. 7, 1989

[87] PCT Pub. No.: WO88/09730
PCT Pub. Date: Dec. 15, 1988

[30] Foreign Application Priority Data
Jun. 12, 1987 [AT] Austria .................. 1490/87
Apr. 8, 1988 [AT] Austria .................. 911/88

[51] Int. Cl.⁵ ............................ B60C 27/14
[52] U.S. Cl. .................. 152/225 C; 152/213 A; 152/221; 152/175
[58] Field of Search .......... 152/208, 213, 225 R, 152/225 C, 221, 223, 226, 227, 228, 175, 213 A

[56] References Cited

U.S. PATENT DOCUMENTS

| | | | |
|---|---|---|---|
| 1,808,416 | 6/1931 | Kennedy | 152/225 R |
| 2,433,436 | 12/1947 | Cook | 152/225 R |
| 2,525,367 | 10/1950 | Miller | 152/228 |
| 2,653,642 | 9/1953 | Cella | 152/213 R |
| 2,936,807 | 5/1960 | Hajart | 152/225 R |
| 2,953,182 | 9/1960 | Brown | 152/226 |
| 4,244,412 | 1/1981 | Seggio | 152/225 C |
| 4,408,646 | 10/1983 | Forsyth | 152/225 C |
| 4,747,437 | 5/1988 | Magee | 152/228 |

FOREIGN PATENT DOCUMENTS

| | | | |
|---|---|---|---|
| 454386 | 2/1949 | Canada | 152/225 R |
| 578760 | 6/1933 | Fed. Rep. of Germany | 152/225 R |
| 1062870 | 4/1954 | France | 152/225 R |

Primary Examiner—Michael W. Ball
Assistant Examiner—Francis J. Lorin
Attorney, Agent, or Firm—Bachman & LaPointe

[57] ABSTRACT

Snow chain for improving road contact of a vehicle comprising articulated plastic links which are interconnected without clearance and each have a bottom part as well as side walls, which by the load of the wheel clamp upon the sides of the wheel or the tire respectively by the elastic properties of the material of the links.

3 Claims, 4 Drawing Sheets

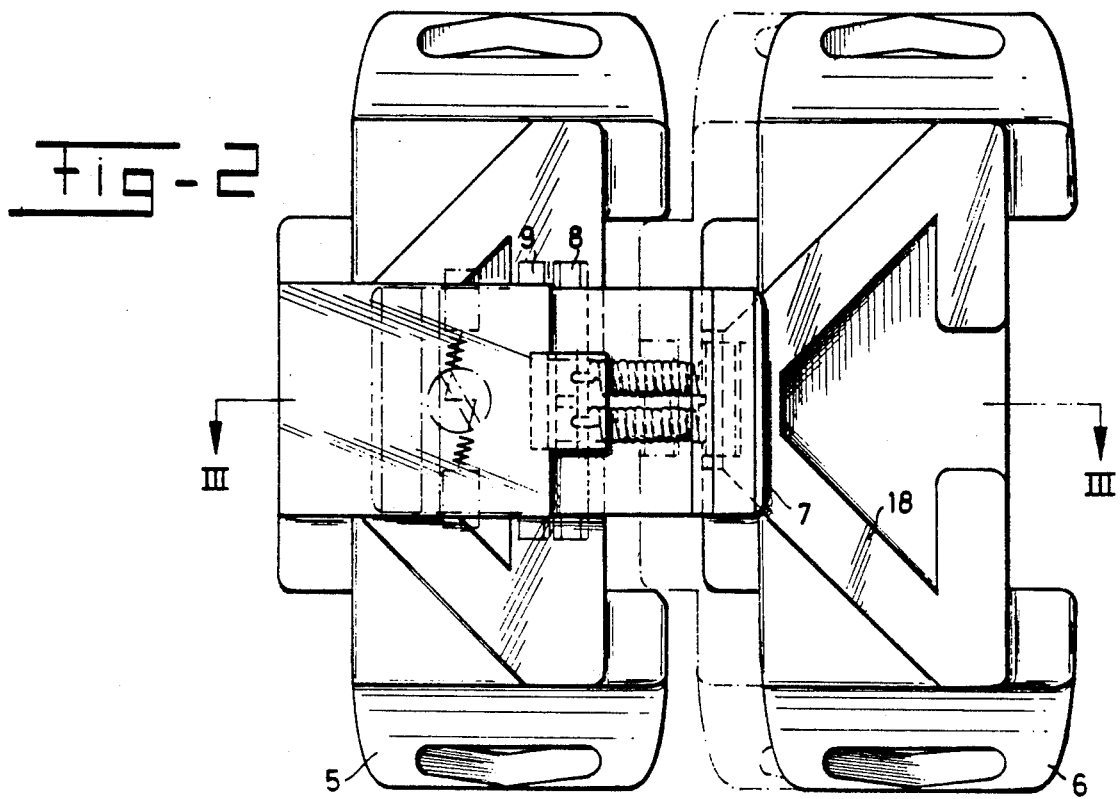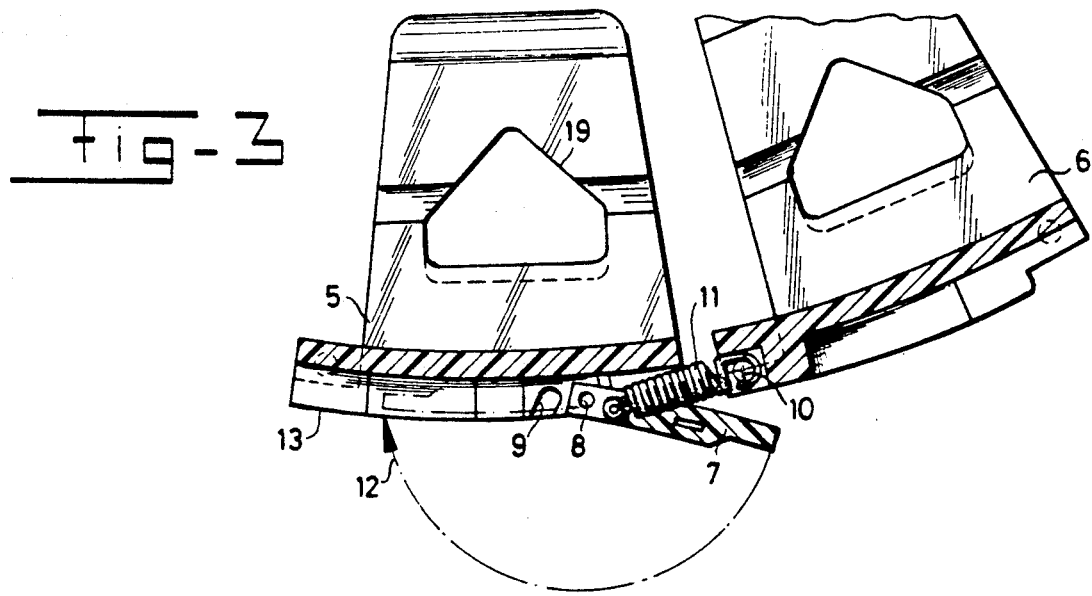

DETACHABLE ANTI-SKID CHAIN FOR A VEHICLE WHEEL

DESCRIPTION INTRODUCTION

The invention relates to a detachable anti-skid chain for a vehicle wheel, comprising articulated links and a snap closure which can connect together the ends of the chain which can surround the periphery of a vehicle wheel, and has parts with a contouring which increase the grip of the wheel on the ground, said chain having links which are in the form of clamps made of an elastically bendable plastic and each have a bottom part and side parts which are integral therewith and can grip around the sides of the wheel tire, while each bottom part with the two side parts forms such an elastic unit that the clamping on the tire or release of the tire is determined solely by the load placed on the clamp in question by the vehicle wheel.

Such a detachable anti-skid chain is known from DE-A-2,553,342. This known anti-skid chain comprises a number of clamps which are distributed at intervals along the periphery of the wheel, and which are connected together by means of side cords, which are in turn connected to each other by transverse elements spaced at intervals in the region which lies between the clamps in question.

This anti-skid chain is relatively complex in design and has the disadvantage that it is difficult to fit, despite the fact that the clamps can grip elastically around the wheel tires as soon as the wheel rolls onto a clamp and thereby takes this clamp from the spread open position to the closed position enclosing the wheel tire. The side cords and the transverse elements connecting them actually give rise to the risk that during fitting the interval between the clamps will not be ideal, which gives rise to difficulties when the chain ends are being connected to each other, i.e. during closing of the chain. The clamps already enclosing the wheel tires can no longer be pushed along the tire in the peripheral direction.

The object of the invention is to produce an anti-skid chain which is simple in design and does not have the disadvantages of the known chain when it comes to fitting.

This object is achieved according to the invention in that the chain is solely made up of clamps which are directly connected to each other in an articulated manner and have the contouring on their outside.

The articulated connection which permits no displacement in the peripheral direction, in conjunction with the clamping of the side parts of the wheel, in particular the side wall of the wheel tire, means that further clamping is unnecessary because there are no longer any length tolerances, and fitting is very simple because when the wheel is driven onto the chain lying stretched on the ground the first link and the subsequent links become clamped on the periphery of the wheel, following which a connection of the chain ends is all that is necessary.

The chain is therefore almost exclusively made up of clamps, i.e. essentially of a series of articulated parts, which simplifies the design.

This automatic clamping can be achieved in various ways. It is, for example, possible according to the invention to form the chain links in such a way that when not under load each bottom part is arched inwards, i.e. away from the bearing surface side, and the side parts form such a rigid elastic unit with the bottom part that when the bottom part is under load, the downward bending of the bottom part causes them to lie elastically against the sides of the wheel or its tire and be held there by friction contact. During driving onto the chain the clamping must be maintained to insure that the chain remains in place on the periphery of the wheel before the two ends are connected. This can be achieved through the fact that the bending bottom part which is arched when not under load is formed in such a way and is of such shape at the transition point to the side parts that after the bending under load, when the side parts rest against the sides of the wheel, the clamping is maintained.

It is also conceivable to achieve this through friction of the side parts of the link on the curved side walls of the tire of the wheel, i.e. the tendency of the bottom part of the chain link which is bent and arched under load to bend back when the load is removed is not capable of bringing about the necessary, albeit slight, shift of the side links along the surface of the side walls of the tire.

It is, however, also conceivable to have a chain link which is designed in such a way that it is opened when the wheel drives onto the chain, i.e. the side walls are spread and then clamp onto the wheel or its tire.

According to the invention, the links can comprise the center part corresponding to the width of the bearing face of the tire and contoured with a bearing section on its bottom side and two opposite side walls which join this center part laterally so that they rest against the flanks of the tire. These side walls can have recesses in the region of a concentrically running elevation of the tire flanks.

The connection of the chain links can be in the form of a mechanical hinge with hinge pin, the axis of which runs at right angles to the lengthwise direction of the chain.

However, a preferred embodiment is that in which, according to the invention, the links are connected to each other by at least one flexible band of high tensile strength. This band then forms the connection which should be stretch-free in the peripheral direction of the wheel, i.e. in the lengthwise direction of the chain, and should be sufficiently flexible to permit placing on the periphery of the wheel. The band(s) preferably extend(s) in a shape and force transmitting way through the material of the links, i.e. they are, for example, incorporated in the material of the plastic links by the material being cast round them.

Bands of polyaramid fibers are preferred.

The connection of the two ends of the chain takes place by means of associated coupling elements disposed on the bearing face of the two end links of the band, and it is preferable to have an embodiment comprising a coupling spring which can be tensioned with an elbow lever and slotted into a spring anchorage, in addition to a number of optional anchorages for slotting in the elbow lever. This connection is therefore not made until after the band is fitted on the periphery of the wheel and the distance between the ends of the chain can be established. The spring is then slotted in at one end and a transverse pin present at the other end is slotted into the most suitable anchorage, following which the elbow lever is shifted. The spring is then tensioned, and the connection is anchored through the bending of the elbow lever.

The invention will now be explained in greater detail with reference to the drawings.

FIG. 2 is a view of the bottom side of two links of the chain, at the point where the chain ends are connected to each other.

FIG. 3 is a cross-section along the line III—III of FIG. 2.

Figure 1:
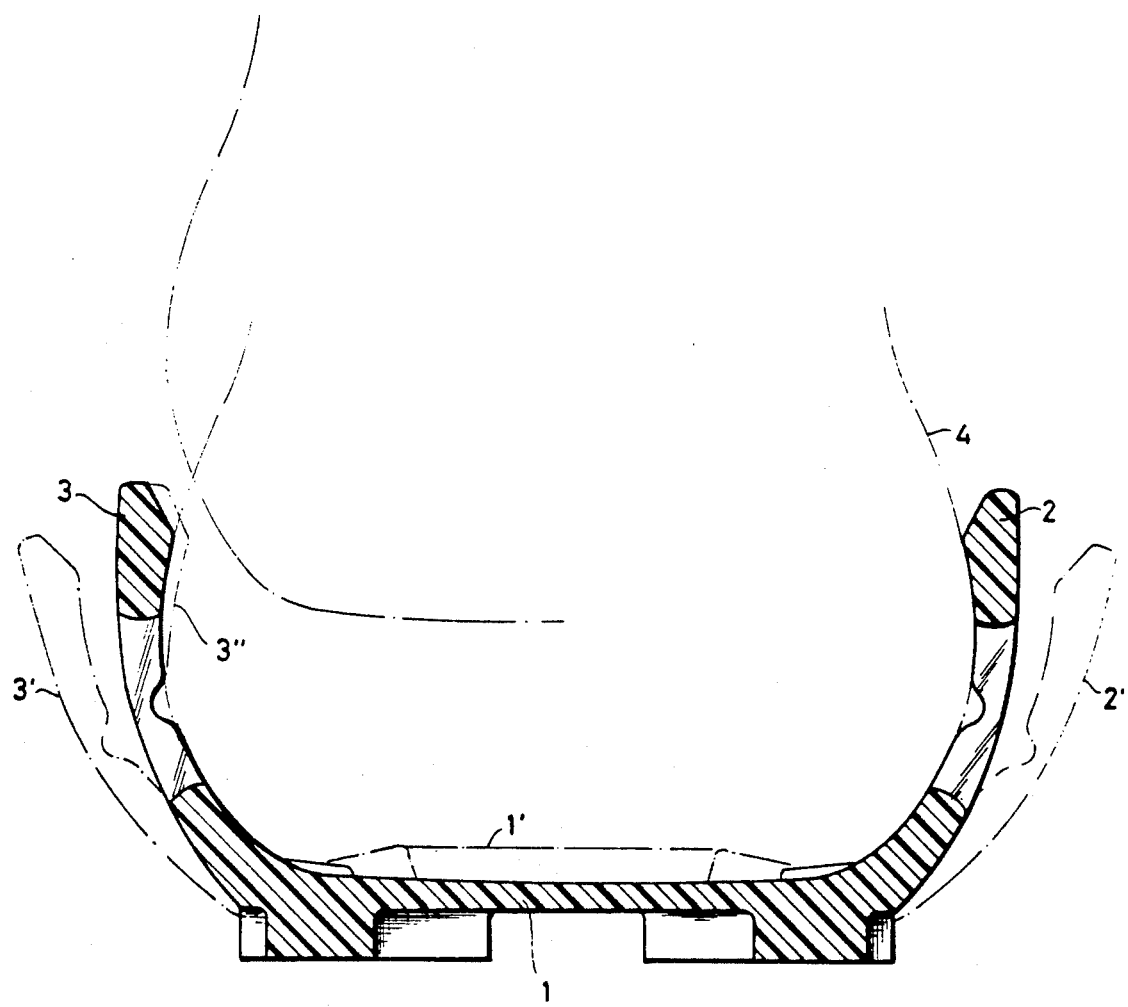
FIG. 1 shows a cross-section through a link of the chain according to the invention.

The chain link shown in FIG. 1 comprises a bottom part 1 with side parts 2, 3. The tire is indicated by the line 4.

The shape of the link when not under load is shown by dashed and dotted lines. The bottom part 1' is then arched upwards slightly, and the side parts 2' and 3' are bent outwards. When the tire drives onto the chain link the bottom 1' is pressed downwards into the position shown by solid lines. The side parts then bend inwards and are laid against the flanks of the tire, with elastic stress, as indicated by the line 3'' on the left in FIG. 1.

Figure 6:
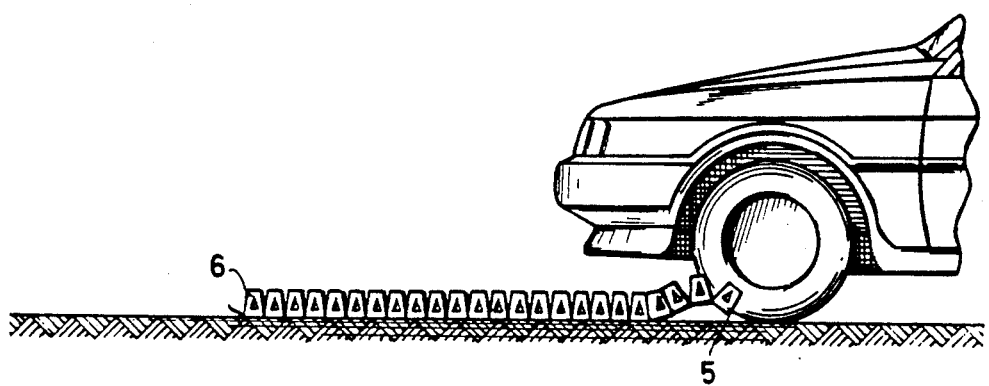
FIGS. 6, 7 and 8 show in side view the fitting of the chain on a motor vehicle.
Figure 7:
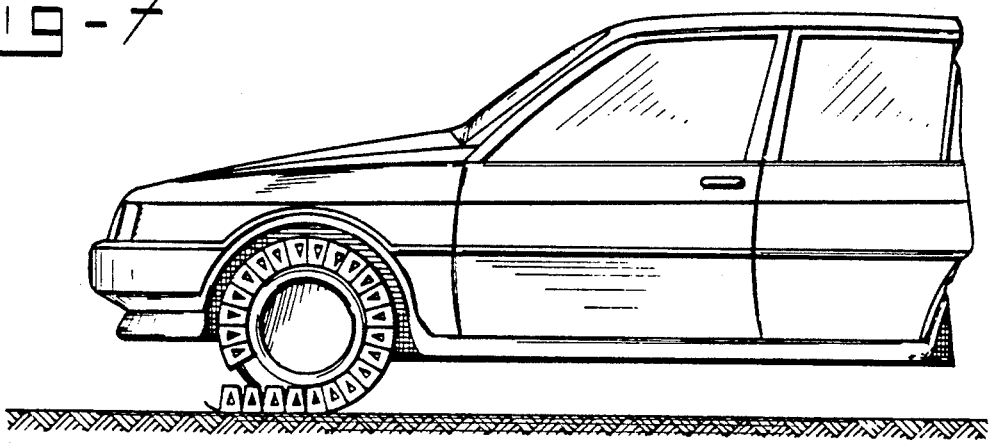
Figure 8:
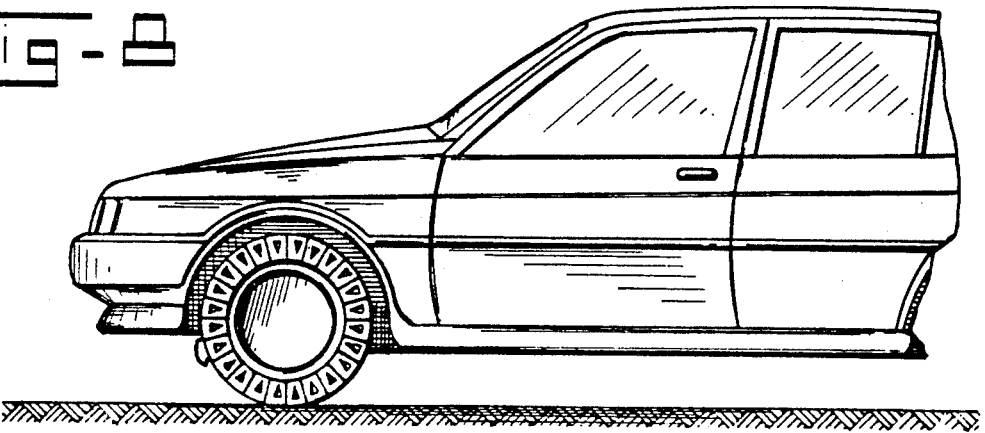

The fitting takes place simply by driving onto the chain, as shown in FIGS. 6, 7 and 8.

The line 3'' also illustrates an embodiment of the chain link according to the invention which when not fitted and not under load has a shape which is spread out elastically as soon as the tire enters the chain link.

FIGS. 2 and 3 show the two chain links 5 and 6 at the end of the chain, which are to be joined together.

The connecting element comprises an elbow lever 7 which can be slotted into undercut recesses 9 in the bearing surface side of the chain link 5 by means of a transverse pin 8 acting as a hinge. The other chain link 6 has a transverse pin 10 for slotting in the spring 11 of the snap closure. This pin 10 could be insertable in the transverse direction, but could also be slotted into recesses 9, just like the pin 8.

It can be seen clearly from FIG. 3 that when the connection has been made between the spring 11 and the link 6 and the elbow lever 7 has been slotted in, a tensioned connection can be achieved by shifting the elbow lever to the left, in the direction of the arrow 12. The closure is then inside the outer periphery 13 of the chain.

The chain links are connected to each other without play in the lengthwise direction of the chain. The closure therefore insures that the two ends of the chain are connected to each other, but no subsequent adjustment is needed.

The various snap-in facilities for the elbow lever of the lock are required so that the chain will fit regardless of the degree of wear of the tire.

Figure 4:
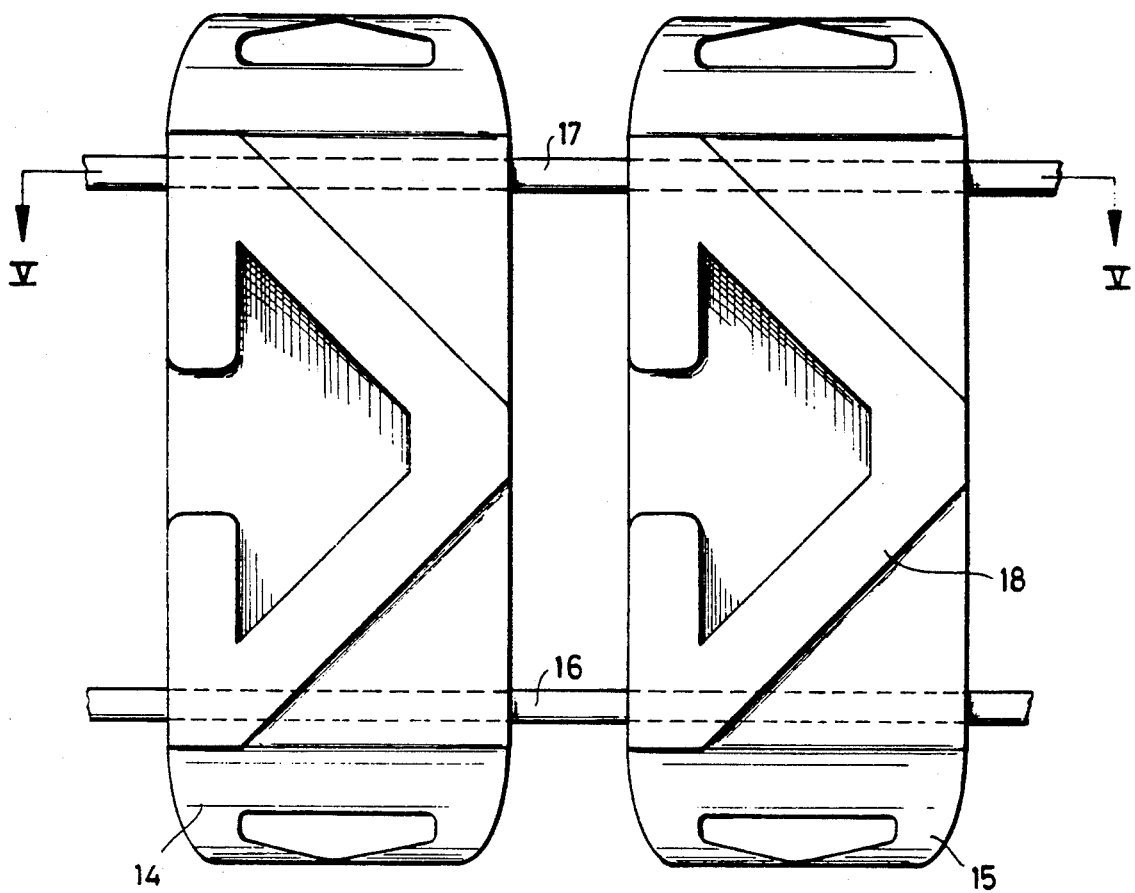
FIG. 4 is a view of the bottom side of two chain links which are conncted with bands.
Figure 5:
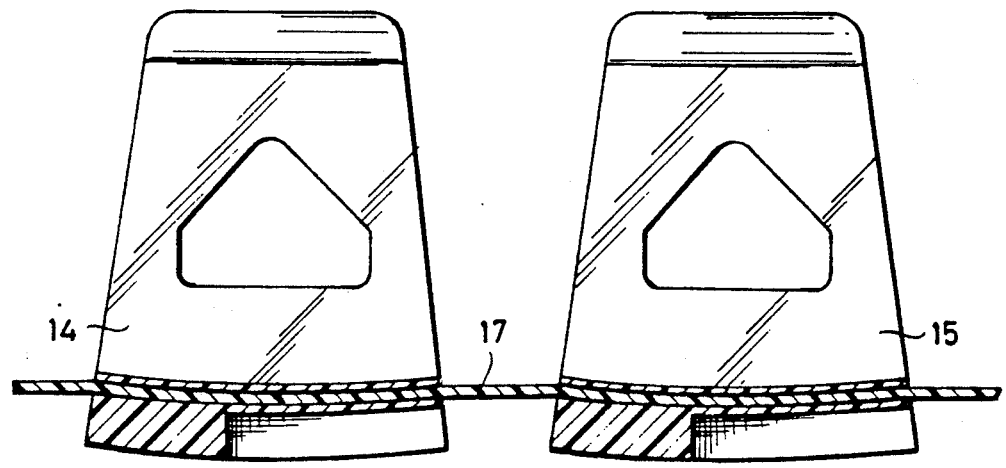
FIG. 5 is a cross-section along the line V—V of FIG. 4.

FIGS. 4 and 5 show an embodiment in which the chain links 14 and 15 are connected to each other by means of two bands 16 and 17, made of aramid fibers. As FIG. 5 shows, these bands are completely incorporated in the material of the links.

The chain links have a contouring 18 and recesses 19 in the side walls.

We claim:

1. Detachable anti-skid chain for a vehicle wheel tire, comprising exclusively a series of individual mutually directly interconnected articulated links, including opposed end links to form a chain, and a snap closure which can connect together the opposed end links of the chain, wherein said chain can surround the periphery of a vehicle wheel tire by interconnecting the opposed end links in a position in which the chain is mounted on a vehicle wheel tire, each link of the chain having a contouring which increases the grip of the wheel on the ground and each link of the chain being in the form of a clamp made of an elastically bendable plastic each with a bottom part and opposite side parts which extend away from the contouring and which are integral with the bottom part such that bottom part and side parts are made from the same material, said side parts being adapted to solely engage the sides of the wheel tire, each bottom part forming with the two side parts an elastic unit such that the clamping of the elastic unit on the tire or release from the tire is determined solely by the load placed on the bottom part of the link by the vehicle wheel, wherein when not under load each bottom part is arched inwards away from the contouring and towards the tire while the side parts form a rigid elastic unit and are bent outwards away from the tire when not under load with said bottom part such that when the bottom part is under load the downward bending of the bottom part causes said side parts to be applied elastically against the sides of the tire and be held there by friction, and while not under load, the bottom part by curving inwardly moves the side parts away from the tire, wherein the chain is solely made up of links which are directly connected to each other in an articulated manner by at least one flexible band of high tensile strength wherein the bands extend through the material of the links in a manner which makes them integral with the links, with each link having a direct connection with at least one other link.

2. Chain according to claim 1, wherein the side parts have recesses disposed therein.

3. Chain according to claim 1, wherein the bands are made of polyaramid fibers.

* * * * *